United States Patent [19]

Suminski

[11] Patent Number: 5,334,074
[45] Date of Patent: Aug. 2, 1994

[54] ANTLER SOUND SIMULATING GAME CALL

[76] Inventor: Joe Suminski, 204 N. 3rd St., Centerville, Ind. 47330

[21] Appl. No.: 42,383

[22] Filed: Apr. 2, 1993

[51] Int. Cl.⁵ .............................................. A63H 5/00
[52] U.S. Cl. ..................................... 446/418; 84/403
[58] Field of Search ............... 446/418, 419, 421, 397, 446/239; 84/408–410, 402–404

[56] References Cited

U.S. PATENT DOCUMENTS

| | | | |
|---|---|---|---|
| 1,088,482 | 2/1914 | Timmons | 84/403 |
| 1,492,074 | 4/1924 | Dayton | 446/239 |
| 2,399,636 | 5/1946 | Johnson | 446/421 |
| 4,850,928 | 7/1989 | Stewart | 446/397 |
| 5,019,008 | 5/1991 | Hughes | 446/418 X |

Primary Examiner—Mickey Yu
Attorney, Agent, or Firm—H. Jay Spiegel

[57] ABSTRACT

A game call includes two parts which are used in interaction to simulate the sounds of the rattling of antlers as two bucks engage in battle. A first part includes a handle and a distal portion having two rows of exterior teeth. A second part has a handle and a distal portion having an opening with inner walls defining undulating grooves. The two parts are engaged together in various ways to simulate various sounds which occur when two bucks are engaging in battle, including sparring, clashing, grinding and rattling sounds. The game call is useful in attracting bucks while hunting.

6 Claims, 2 Drawing Sheets

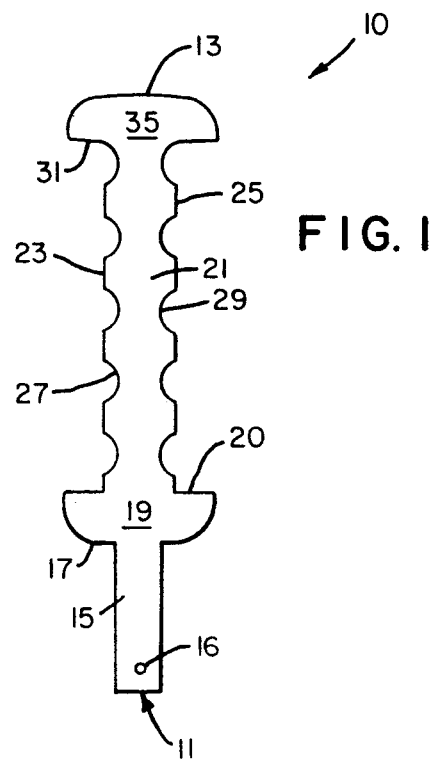
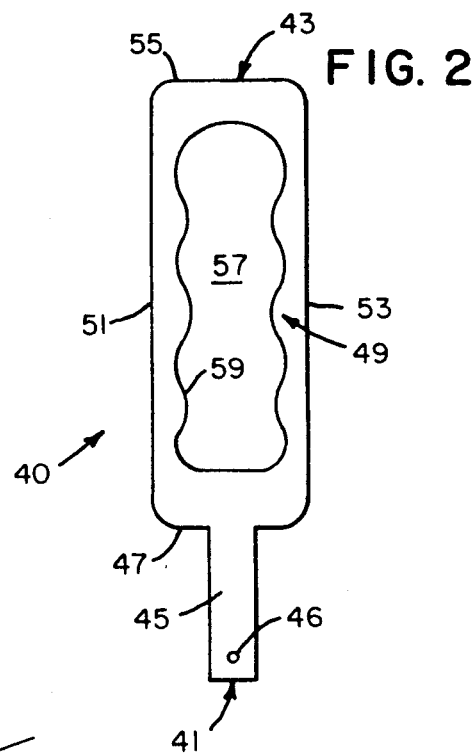
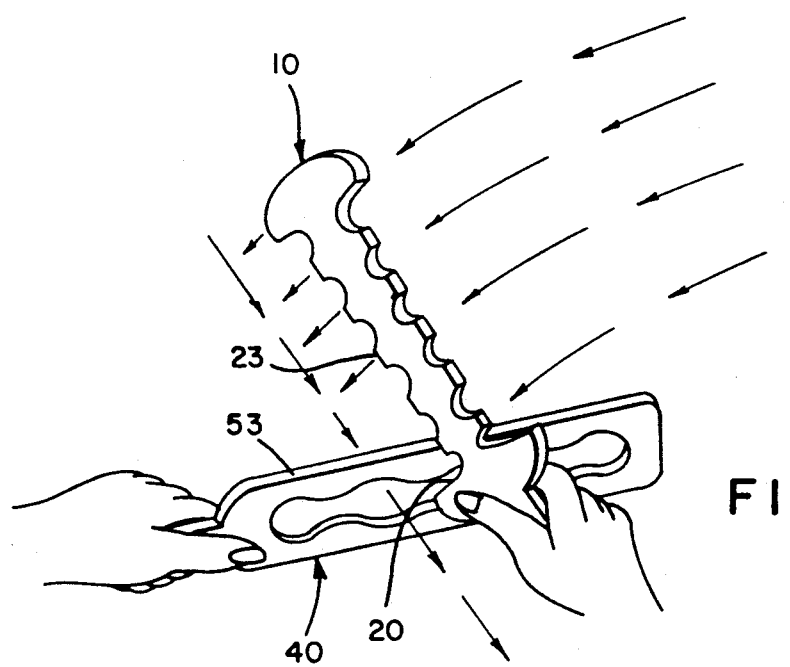

ANTLER SOUND SIMULATING GAME CALL

BACKGROUND OF THE INVENTION

The present invention relates to an antler sound simulating game call. In the prior art, game call devices are known. However, Applicant is unaware of any such device which includes the features and aspects of the present invention. The following prior art is known to Applicant:

U.S. Pat. No. 2,629,968 to Herter discloses a squirrel call including a striker bar having a toughened surface which is drawn across an edge of a reed to make squirrel-like sounds. The present invention differs from the teachings of Herter as contemplating a first part having teeth interacting with a second part having an inner opening defined by undulating grooves to make antler simulating sounds.

U.S. Pat. No. 2,642,699 to Green discloses a duck call including a first part having a plurality of equi-spaced lateral teeth defining grooves therebetween and a second part consisting of a rectangular cubic block of wood which is engaged with the teeth to simulate duck sounds. The present invention differs from the teachings of Green as contemplating a first part having exterior teeth and interacting with a second part having an inner opening having walls defining undulating grooves, which parts interact to simulate antler sounds.

U.S. Pat. No. 3,100,948 to Tax discloses a wild fowl call having a slate bar secured to an actuator arm so that the slate bar may be slid over the edges of two side walls to mechanically reproduce the vocal calls of fowls such as wild geese. The present invention differs from the teachings of Tax as contemplating a first part having rows of exterior teeth which interact with a part having an inner opening with undulating walls to simulate antler sounds.

SUMMARY OF THE INVENTION

The present invention relates to an antler sound simulating game call. The present invention includes the following interrelated objects, aspects and features:

(A) The inventive game call is made up of two parts which interact with one another to simulate the various sounds of antlers which are created by two bucks engaging in battle. A first part includes a handle from which extends an elongated portion having side walls with notches therein to form two rows of teeth. Laterally extending shoulders define the extent of the tooth elongated portion.

(B) The second part includes a handle and a distal portion generally rectangular in configuration and having a central opening defined by walls which undulate to form a series of opposed grooves.

(C) The first and second parts may be engaged with one another in various ways to facilitate simulation of the various sounds of the rattling of antlers as two bucks engage in battle. These sounds may include sounds of sparring, rattling, clashing and grinding.

(D) In the preferred embodiment, the first and second parts are made of a plastic material such as, for example, nylon. Applicant has found that making the first and second parts of nylon best facilitates simulation of the actual sounds of the rattling of antlers as two bucks engage in battle. The inventive game call may be utilized to attract bucks while hunting.

As such, it is a first object of the present invention to provide an antler sound simulating game call.

It is a further object of the present invention to provide such a device including first and second parts which interact with one another to create the sounds of the rattling of antlers.

It is a still further object of the present invention to provide such a game call wherein one of the parts includes two rows of exteriorly facing teeth.

It is a yet further object of the present invention to provide the other part with an opening having walls defining undulating grooves.

These and other objects, aspects and features of the present invention will be better understood from the following detailed description of the preferred embodiment when read in conjunction with the appended drawing figures.

BRIEF DESCRIPTION OF THE DRAWINGS

FIG. 1 shows a side view of a first part of the present invention.

FIG. 2 shows a side view of a second part of the present invention.

FIG. 3 shows a first mode of interaction of the first and second parts.

SPECIFIC DESCRIPTION OF THE PREFERRED EMBODIMENT

Figure 4:
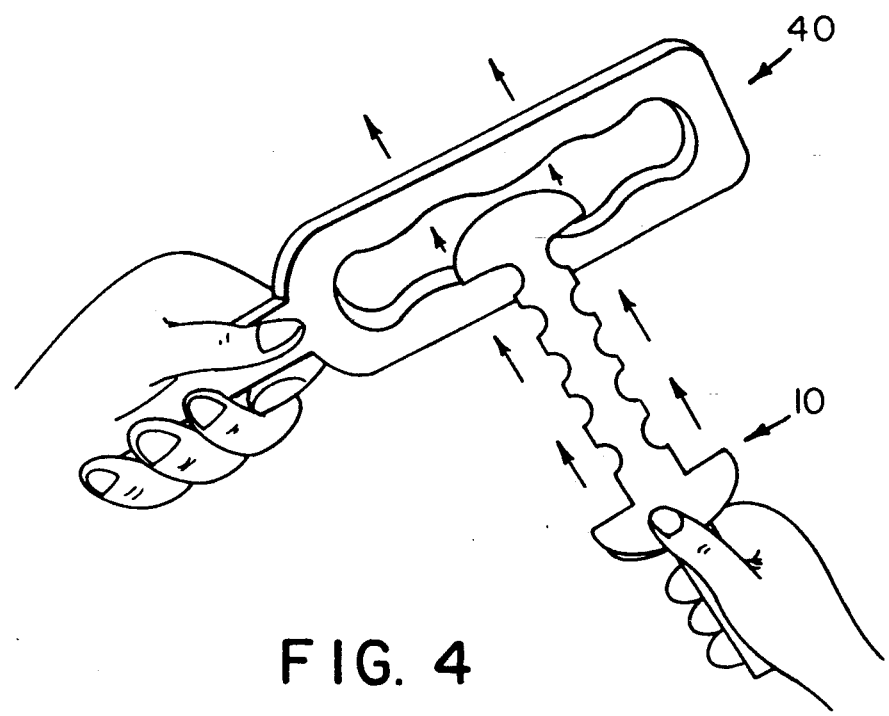
FIG. 4 shows a second mode of interaction of the two parts.

With reference, first, to FIG. 1, a first part of the present invention is generally designated by the reference numeral 10 and is seen to include a proximal end 11 and a distal end 13. At the proximal end 11, a handle 15 is formed which extends from the end 11 to a shoulder 17 formed on a laterally outwardly extending portion 19.

With further reference to FIG. 1, extending distally of the portion 19 is a relatively thinner longitudinally extending portion 21 having side walls 23 and 25. The side walls 23 and 25 have a series of notches 27 cut out from them for a purpose to be described in greater detail hereinafter. The portion 21 extends longitudinally distally away from the portion 19 to a shoulder 31 which forms a part of a distal termination portion 35 including the distal end 13. The handle 15 may include an opening 16 therethrough which may selectively receive a string facilitating carrying of the first part 10.

With reference, now, to FIG. 2, a second part is generally designated by the reference numeral 40 and is seen to include a proximal end 41 and a distal end 43. At the proximal end 41, a handle 45 is provided which includes an opening 46 designed to receive a string to facilitate carrying the part 40.

The handle 45 extends distally from the end 41 thereof to a shoulder 47 defining a starting point for an elongated distal portion 49 including side walls 51, 53, an end wall 55 at the distal end 43 thereof and an opening 57. As seen in FIG. 2, the opening 57 is designed with outer walls 59 which include undulating grooves and projections as shown.

As explained above, the present invention, including the parts 10 and 40, may be used to simulate noises made by the antlers of two bucks while they are engaging in battle. In the preferred embodiment of the present invention, the parts 10 and 40 are made of a suitable plastic material such as, for example, NYLON.

FIG. 3 shows an example of the interaction between the parts 10 and 40 which would occur when simulating the sounds of two bucks sparring. In this phase of a battle between bucks, the respective antlers will touch and click tines as they face off or line up for the battle. As shown in FIG. 3, in order to simulate these sounds, the side wall 53 of the part 40 is struck by the side wall 23 of the part 10 near the enlarged portion 19 shoulder 20. The wall 23 may be slid against the wall 53 with controlled pressure with the angle of engagement being varied to vary the sound which emanates. Of course, alternatively, the part 40 may be used to strike the side wall of the part 10 and the part 40 may be slid with respect to the stationary part 10 to provide similar sounds.

When two bucks are having a battle, in most instances, the second phase of the encounter includes a violent clashing of antlers. FIG. 4 shows how the two parts 10, 40 may interact to simulate these sounds. With the distal end 13 of the part 10 inserted through the opening 57 in the part 40 and then turned at a right angle so that the shoulders 31 and 20 of the part 10 prevent removal from the opening 57 of the part 40, the side wall 23 or 25 of the part 10 may be slid in engagement with the wall 59 until the shoulder 31 or 20 engages the side wall of the opening 57.

When two bucks are in battle, grinding sounds occur which are caused by frictional contact at the respective bases of the antlers while the bucks push one another. The interaction of the two parts 10, 40 is similar to that which is employed in simulating clashing sounds. However, in simulating grinding sounds, the parts are moved with respect to one another much more slowly with the toothed edge 23 or 25 of the part 10 engaging the wall 59 during the process.

Figure 5:
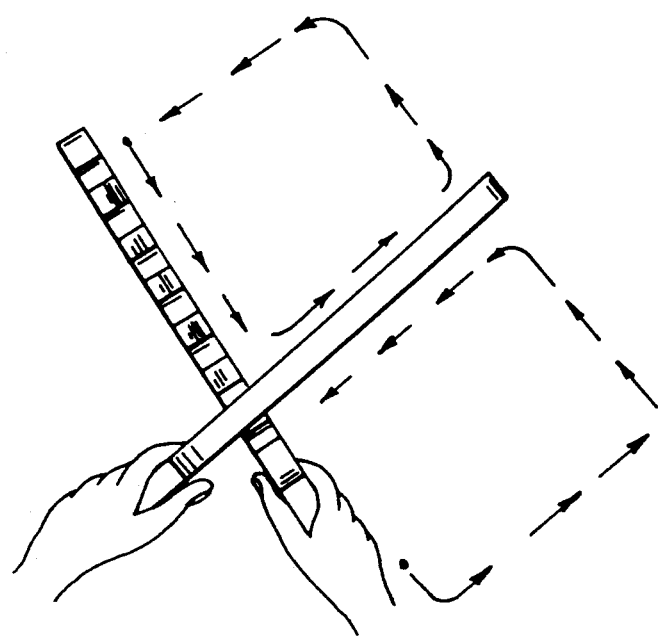
FIG. 5 shows an interaction of the two parts to simulate rattling sounds.

FIG. 5 shows a manner of interaction of the parts 10 and 40 to simulate "rattling". "Rattling" is the sound produced by several tines meshing together at the base as the bucks engage in a pushing and shoving contest. As shown in FIG. 5, this sound may be simulated by meshing the edge 23 or 25 of the part 10 against the wall 59 of the opening 57 using circular motions as shown.

Through experimentation, one may discover the best combination of sound effects which may be produced through interengagement of the parts 10 and 40 to enhance attraction of game. In utilizing the inventive device, consisting of the parts 10 and 40, one may also intersperse the various modes of interengagement of the parts 10 by vocalization of sounds similar to the sounds made by bucks when fighting such as, for example, grunting or blaaahing sounds.

Accordingly, an invention has been disclosed in terms of a preferred embodiment thereof which fulfills each and every one of the objects of the present invention as set forth hereinabove and provides a new and useful antler sound simulating game call of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. An antler sound simulating game call, comprising:
   a) a first part having a proximal handle and a generally flat distal portion having an elongated wall with a plurality of notches therein, said first part distal portion having a proximal termination shoulder wider than a width distal thereof;
   b) a second part having a proximal handle and a widened distal portion having an opening with an elongated notched wall, said opening being enclosed within said distal portion of said second part;
   c) said first part distal portion being inserted into said opening and said first part distal portion elongated wall engaging said elongated notched wall of said opening to create sounds simulating sounds of antlers engaging one another during a battle between two bucks.

2. The game call of claim 1, wherein said first part has two spaced, generally parallel notched walls.

3. The game call of claim 1, wherein said second part distal portion opening has an undulating wall structure.

4. The game call of claim 1, wherein said second part elongated wall extends generally parallel with a longitudinal extent of said opening.

5. The game call of claim 1, wherein each said handle has an opening for receiving a carrying string.

6. The game call of claim 2, wherein said first part distal portion has a distal termination shoulder wider than a width proximal thereof.

* * * * *